United States Patent
Herchenreder et al.

(10) Patent No.: US 10,066,667 B2
(45) Date of Patent: Sep. 4, 2018

(54) RE-CIRCULATING BALL SLIDING SUPPORT ASSEMBLY

(71) Applicant: Accuride International Limited, Northampton, Northamptonshire (GB)

(72) Inventors: Stefan Herchenreder, St. Neots (GB); David Brooks, Northampton (GB); Peter Bayles, Northampton (GB)

(73) Assignee: Accuride International Limited, Northampton (GB)

( * ) Notice: Subject to any disclaimer, the term of this patent is extended or adjusted under 35 U.S.C. 154(b) by 0 days.

(21) Appl. No.: 15/310,687

(22) PCT Filed: May 14, 2015

(86) PCT No.: PCT/GB2015/051433
§ 371 (c)(1),
(2) Date: Nov. 11, 2016

(87) PCT Pub. No.: WO2015/173581
PCT Pub. Date: Nov. 19, 2015

(65) Prior Publication Data
US 2017/0122371 A1   May 4, 2017

(30) Foreign Application Priority Data
May 14, 2014  (GB) .................................. 1408592.2

(51) Int. Cl.
*F16C 29/06*       (2006.01)
*F16C 33/66*       (2006.01)
*F16C 29/00*       (2006.01)

(52) U.S. Cl.
CPC .......... *F16C 29/063* (2013.01); *F16C 29/004* (2013.01); *F16C 29/0609* (2013.01);
(Continued)

(58) Field of Classification Search
CPC .............. F16C 29/0602; F16C 29/0609; F16C 29/0611; F16C 29/0614; E05D 15/06; E05D 15/0626; E05D 15/0621
(Continued)

(56) References Cited

U.S. PATENT DOCUMENTS

| 851,064 A | * | 4/1907 | Burkholder ......... E05D 15/0639 |
| | | | 16/103 |
| 4,651,469 A | * | 3/1987 | Ngian ................. E05D 15/1021 |
| | | | 16/87 R |

(Continued)

FOREIGN PATENT DOCUMENTS

EP    0 795 692 A1    9/1997
EP    1 517 056 A1    3/2005
(Continued)

OTHER PUBLICATIONS

International Search Report for International Application No. PCT/GB2015/051433 dated Oct. 20, 2015.
(Continued)

*Primary Examiner* — Thomas R Hannon
(74) *Attorney, Agent, or Firm* — Thomas B. Ryan; Harter Secrest & Emery LLP (57) ABSTRACT

The present invention provides a sliding support assembly comprising an elongate rail of channel section defining a first web and first and second flanges. A slide cassette is positioned between the first and second flanges of the elongate rail such that the slide cassette and the first and second flanges define a first endless track and a second endless track and a plurality of bearing balls is positioned within the first and second endless tracks. The slide cassette comprises a body member formed from extruded material.

12 Claims, 9 Drawing Sheets

(52) U.S. Cl.
CPC ...... *F16C 29/0611* (2013.01); *F16C 33/6614* (2013.01); *F16C 33/6651* (2013.01)

(58) Field of Classification Search
USPC .......................................... 49/223, 409, 425
See application file for complete search history.

(56) References Cited

U.S. PATENT DOCUMENTS

| | | | |
|---|---|---|---|
| 4,701,057 A | | 10/1987 | Kashiwabara |
| 4,795,272 A | | 1/1989 | Mottate |
| 5,433,527 A | | 7/1995 | Shimo |
| 8,282,283 B2 * | | 10/2012 | Pfister ................. F16C 29/0609 384/45 |
| 2003/0053724 A1 * | | 3/2003 | Matsui ................ F16C 29/0609 384/45 |
| 2005/0054468 A1 | | 3/2005 | Nagai |
| 2006/0078236 A1 | | 4/2006 | Lee |
| 2006/0204151 A1 * | | 9/2006 | Wang ................... F16C 29/0609 384/13 |
| 2008/0085067 A1 * | | 4/2008 | Hsu ..................... F16C 29/0609 384/45 |
| 2010/0209027 A1 * | | 8/2010 | Pfister ................. F16C 29/0609 384/13 |

FOREIGN PATENT DOCUMENTS

| | | |
|---|---|---|
| EP | 2 436 940 A1 | 4/2012 |
| WO | 2013/045884 A1 | 4/2013 |

OTHER PUBLICATIONS

International Written Opinion for International Application No. PCT/GB2015/051433 dated Oct. 20, 2015.
Search Report under Section 17 for United Kingdom Application No. GB1408592.2 dated Oct. 17, 2014.

* cited by examiner

RE-CIRCULATING BALL SLIDING SUPPORT ASSEMBLY

FIELD OF THE INVENTION

The invention relates to sliding support assemblies and particularly re-circulating ball sliding support assemblies which allow for relative linear motion between two elements.

BACKGROUND OF THE INVENTION

Linear motion, re-circulating ball, sliding support assemblies for light-duty applications are known in the art. Such support assemblies allow a variety of potential setups to be achieved in order to move objects along a linear rail. Such rails can be made from extruded lengths of aluminium of, for example, 1 m or 2 m in length. The lengths of rail can be cut to length, drilled or machined as required by the user.

Such sliding supports include a slide cassette and a plurality of bearing balls. The slide cassette is typically made from one or two polymer or resin components, and/or a pressed stainless steel, or nitrided steel member. The slide cassette can be arranged within a length of rail chosen by the user.

For example, U.S. Pat. No. 4,701,057 discloses a sliding support assembly comprising a linear rail having a web and a pair of flanges. The inner surface of each flange includes a first linear guide groove. The assembly includes a slider unit including a pair of endless circulating paths in which a plurality of bearing balls can move. The slider unit includes a main body comprised of upper and lower body sections moulded from plastic material, in which the endless paths are defined, and a frame attached to the main body. The frame comprises a channel-section member having a pair of linear second guide grooves formed in the outer surface of the member's flanges. The linear second guide grooves extend in opposed relation to the corresponding first guide grooves, and partly define the endless paths. Similar slide assemblies are disclosed in U.S. Pat. No. 5,518,317 and EP 1 363 036.

However, there are no known re-circulating ball slide assemblies having a slide cassette arranged within a rail which are adapted for heavy-duty applications, such as heavy doors for hospitals or offices. In heavy-duty applications low friction is especially important to reduce the force required to operate the slide.

Accordingly, there is a need for an improved re-circulating ball sliding support assembly adapted for heavy-duty applications.

SUMMARY OF THE INVENTION

The present invention addresses this need by providing a sliding support assembly comprising:
- an elongate rail of channel section defining a first web and first and second flanges;
- a slide cassette positioned between the first and second flanges of the elongate rail such that the slide cassette and the first and second flanges define a first endless track and a second endless track; and
- a plurality of bearing balls positioned within the first and second endless tracks;
- wherein the slide cassette comprises a body member formed from extruded material.

The extruded material may be metal, plastics or ceramic. The extruded material is preferably metal, such as aluminium or zinc. The extruded material is most preferably an extruded aluminium alloy, such as 6082.

The sliding support assembly may further comprise at least one groove along at least a portion of at least one of the first and second endless tracks.

The body member may comprise a first duct forming an inner linear portion of the first endless track. The first duct may comprise a cylindrical duct with at least one groove. The body member may comprise a second duct forming an inner linear portion of the second endless track. The second duct may comprise a cylindrical duct with at least one groove. The first duct may comprise a first plurality of grooves and the second duct may comprise a second plurality of grooves. The first and second pluralities of grooves may each comprise four grooves. The first and second pluralities of grooves may be equally spaced around the respective first and second ducts.

Preferably, the groove(s) may be longitudinal and extend the length of the body member. The groove(s) may be suitable for use as a lubricant reservoir. The groove(s) may contain lubricant, such as grease.

Each of the first and second endless tracks may take a racetrack shape. That is, each track may be in the shape of a rounded rectangle with curved ends. The curved ends may be substantially semi-circular. The portion of each rectangle closest to an adjacent flange of the elongate rail comprises the outer linear portion of the track, and the portion of the rectangle furthest from an adjacent flange of the elongate rail comprises the inner linear portion of the track.

The body member may comprise a first concave channel and a second concave channel, each of the first and second concave channels being configured to form an inside edge of an outer linear portion of a respective one of the first and second endless tracks.

The first and second flanges may each comprise a concave channel configured to form an outside edge of an outer linear portion of a respective one of the first and second endless tracks.

The slide cassette is preferably not removable from the elongate rail at any position other than at the ends of the elongate rail.

The first and second flanges of the elongate rail may comprise inwardly projecting portions adapted to prevent the slide cassette from being removable from the elongate rail in a direction perpendicular to the web of the elongate rail. The inwardly projecting portions may extend in a direction parallel to the web of the elongate rail.

The slide cassette may further comprise a first end piece and a second end piece.

The first and second end pieces may each comprise a first curved duct and a second curved duct. The first curved duct may connect one of the inner linear portions to one of the outer linear portions to form the first endless track, and the second curved duct may connect the other one of the inner linear portions to the other one of the outer linear portions to form the second endless track.

Each of the first and second end pieces may be formed of at least two parts. Alternatively, each of the first and second end pieces may be formed as a unitary, monolithic piece.

The first and second end pieces may be formed from a plastics material. In particular, each end piece may be moulded from a plastics material or polymer, such as Polypropylene (PP), Nylon (PA) and Polyoxymethylene (POM), or a suitable elastomer such as a form of rubber, or similar material. Alternatively, the end pieces may be formed from machined or cast metal (such as aluminium or zinc) or ceramic.

The first and second endless tracks may lie in a single plane. Alternatively, the first endless track may lie in a first plane which is angled with respect to a second plane in which the second endless track lies. The first plane and second plane may be angled with respect to the web of the elongate rail. The angle between the first plane and the web of the elongate rail may be the same as the angle between the second plane and the web of the elongate rail. Preferably, the angle, $\alpha$, is in the range $0<\alpha \leq 45°$, and is most preferably in the range $0<\alpha \leq 30°$.

At least one of the first and second curved ducts may comprise at least one resilient member. The resilient member may form at least a portion of a wall of the curved duct and the portion of the wall of the curved duct may be adjacent to an outlet of the curved duct. The portion of the wall of the first curved duct may be on an inside curve of the first curved duct. The end piece may comprise two slits wherein the two slits define the resilient member.

The resilient member may be formed from plastics, rubber, steel or any other suitable material. The resilient member may be formed of the same material as the rest of the end piece. Alternatively, the resilient member may be formed of a different material to the material of the rest of the end piece.

The sliding support assembly may further comprise a bracket mounted to the slide cassette for sliding therewith. The bracket may comprise a hooked portion defining a channel in which a bar is supported. The bar may be rotatably mounted in the channel. The channel is preferably parallel to the length of the elongate rail. A door may be fixed to the bar.

The bracket may comprise first and second end sections which extend around first and second ends of the slide cassette respectively into the channel of the elongate rail. The ends of the slide cassette are separated from one another along the length of the elongate rail.

The slide support assembly may further comprise a buffer at an end of the elongate rail. The buffer may be configured to contact the bracket. The buffer may be configured to contact at least one of the end sections of the bracket.

The rail may be connectable to a first object using a fixing means mounted within one or more countersunk holes in the web of the rail. The rail may be mounted to a support beam using a fixing means mounted within one or more countersunk holes in the web of the rail. Examples of suitable fixing means include screws, rivets or nails.

The assembly may include more than one slide cassette mounted within the elongate rail. Each of the slide cassettes may have one or more of the features recited above in connection with the slide cassette.

The rail may comprise a length of aluminium, polymer, steel or other suitable material or alloy, manufactured by extrusion, forming, machining or other suitable process. The rail may comprise at least two lengths of rail connected together end to end.

In a second aspect of the invention, there is provided a body member for a slide cassette comprising
- a first duct and a second duct, wherein each duct is suitable for forming an inner linear portion of a respective bearing ball track; and
- a first concave channel and a second concave channel, wherein each concave channel is suitable for forming an inside edge of an outer linear portion of a respective bearing ball track;
- wherein the body member is formed from extruded material.

The extruded material may be metal, plastics or ceramic. The extruded material is preferably metal, such as aluminium or zinc. The extruded material is most preferably an extruded aluminium alloy, such as 6082.

The first duct may comprise at least one groove. The first duct may comprise a first plurality of grooves. The second duct may comprise at least one groove. The second duct may comprise a second plurality of grooves.

The groove(s) may be longitudinal. The body member groove(s) are preferably suitable for use as a lubricant reservoir. The grooves may contain lubricant.

The first duct, second duct, first channel and second channel may be aligned in a single plane. Alternatively, a first plane defined by the first duct and the first channel may be different to a second plane defined by the second duct and the second channel. The angle, $\beta$, between the first plane and the second plane is preferably in the range $0<\beta \leq 45°$, and is most preferably in the range $0<\beta \leq 30°$.

In a third aspect of the invention, there is provided an end piece for a slide cassette comprising a first curved duct and a second curved duct, wherein each curved duct is suitable for forming part of an endless track for bearing balls.

The end piece may comprise alignment means suitable for ensuring alignment of at least one outlet of at least one of the first and second curved ducts with a complementary duct in the slide cassette.

The alignment means may comprise at least one protrusion extending from the end piece. The at least one protrusion may be one of a first plurality of protrusions located around an outlet of the first curved duct. The at least one protrusion may further comprise one of a second plurality of protrusions located around an outlet of the second curved duct.

The curved ducts may be substantially semi-circular.

The first and second curved ducts may lie in a single plane. Alternatively, the first curved duct may lie in a first plane which is angled with respect to a second plane in which the second curved duct lies. The angle, $\beta$, between the first plane and the second plane is preferably in the range $0<\beta \leq 45°$, and is most preferably in the range $0<\beta \leq 30°$.

At least one of the first and second curved ducts may comprise at least one resilient member. The resilient member may form at least a portion of a wall of the curved duct and the portion of the wall of the curved duct may be adjacent to an outlet of the curved duct. The portion of the wall of the first curved duct may be on an inside curve of the first curved duct. The end piece may comprise two slits wherein the two slits define the resilient member.

The resilient member may be formed from plastics, rubber, steel or any other suitable material. The resilient member may be formed of the same material as the rest of the end piece. Alternatively, the resilient member may be formed of a different material to the material of the rest of the end piece.

BRIEF DESCRIPTION OF THE FIGURES

By way of example, embodiments of sliding support assemblies according to the invention will now be described with reference to the accompanying drawings, in which.

DETAILED DESCRIPTION OF THE FIGURES

FIGS. 1 to 15 show various views of a sliding support assembly 1 according to a first embodiment of the present invention. The sliding support assembly 1 includes a support beam 2. Mounted on the support beam are a fascia 4 and an elongate rail 10 of channel section defining a first web 12 and first and second flanges 14, 16.

Figure 1:
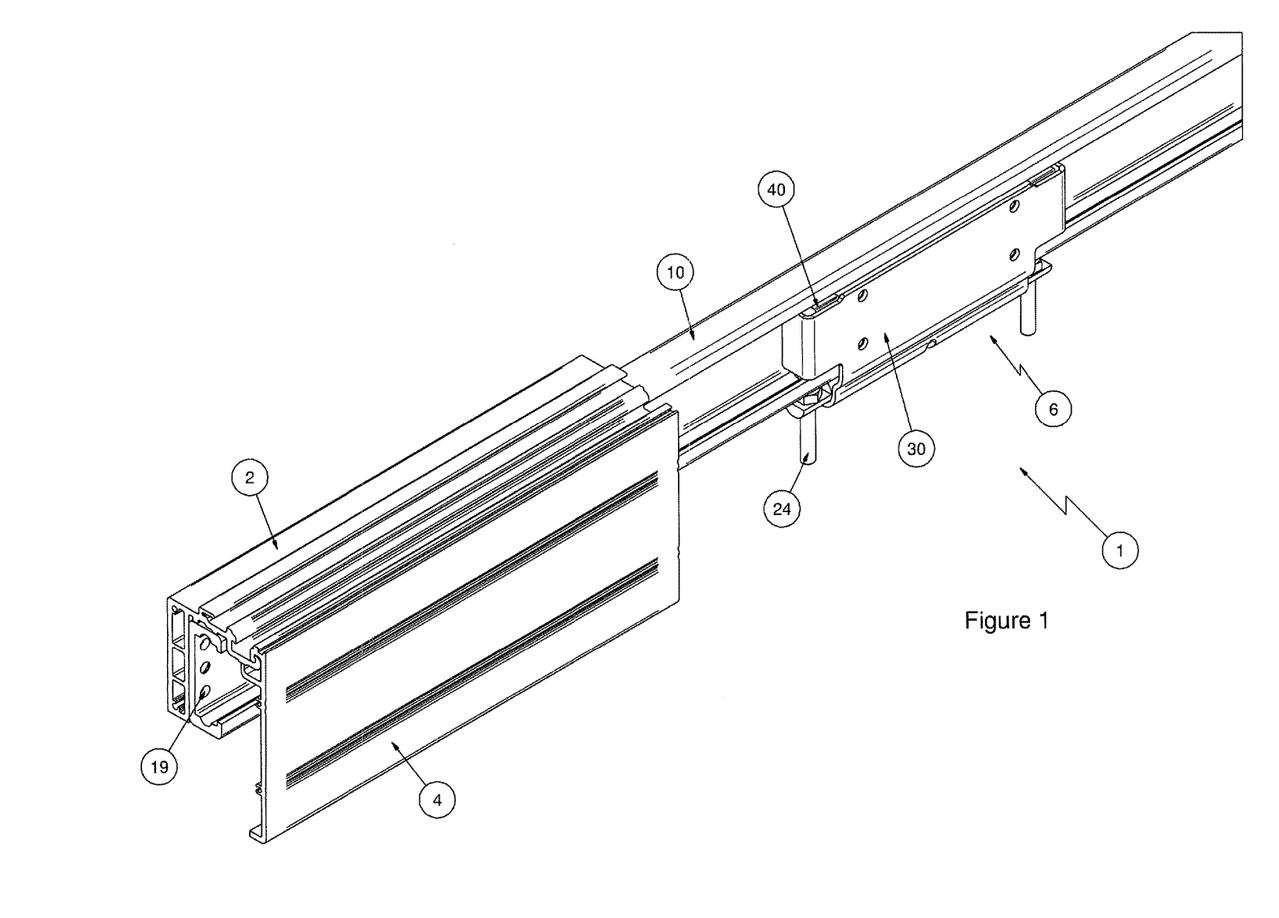
FIG. 1 is a perspective view of a recirculating sliding support assembly in accordance with a first embodiment of the present invention.

The sliding support assembly 1 also includes a slide unit 6 comprising a slide cassette 40 and fixing means 20. The sliding support assembly may comprise two or more slide units 6. The slide unit 6 is configured to slide along the rail 10. That is, the slide unit 6 is constrained to move in the two opposite directions parallel to the longitudinal axis of the rail 10. The slide cassette 40 comprises a body member 50, a plurality of bearing balls 60, and first and second end pieces 70. The fixing means 20 includes a bracket 30, bar 22 and securing means 24.

For clarity, in FIG. 1 the support beam 2 and fascia 4 are shown extending along only a portion of the length of the rail 10. However, in practice, the support beam 2 and fascia 4 would generally extend along substantially the full length of the rail 10.

The support beam 2 provides a stable and secure mounting for the rail 10 and the fascia 4. The support beam 2 is preferably formed from extruded metal, such as extruded aluminium, but may be formed from any suitable material.

The rail 10 is connectable to the support beam 2 using a fixing means mounted within one or more countersunk holes 19 in the web 12 of the rail 10. Examples of suitable fixing means include screws, rivets or nails.

The fascia 4 is mounted on the front of the sliding support assembly 10 to provide an aesthetically pleasing finish to the assembly. The fascia 4 also reduces the build-up of dust and dirt in the rail 10, by covering the opening of the rail 10. The fascia 4 is preferably formed from extruded metal, such as extruded aluminium, but may be formed from any suitable material.

The fascia 4 is mounted to the support beam 2 via complementary hooked sections 3, 5 of the support beam 2 and fascia 4 respectively, which allow easy mounting and removal of fascia 4. However, the fascia 4 may be mounted to either the support beam 2 or rail 10 by any suitable means.

The web 12 and first and second flanges 14, 16 of the rail 10 together define an interior channel section in which the slide cassette 40 of the slide unit 6 is mounted. As shown most clearly in FIG. 2, the first and second flanges 14, 16 each comprise a concave longitudinal channel 15, each of which forms an outside edge of first and second endless tracks 80 of the slide cassette 40, respectively, as will be further described below.

Figure 2:
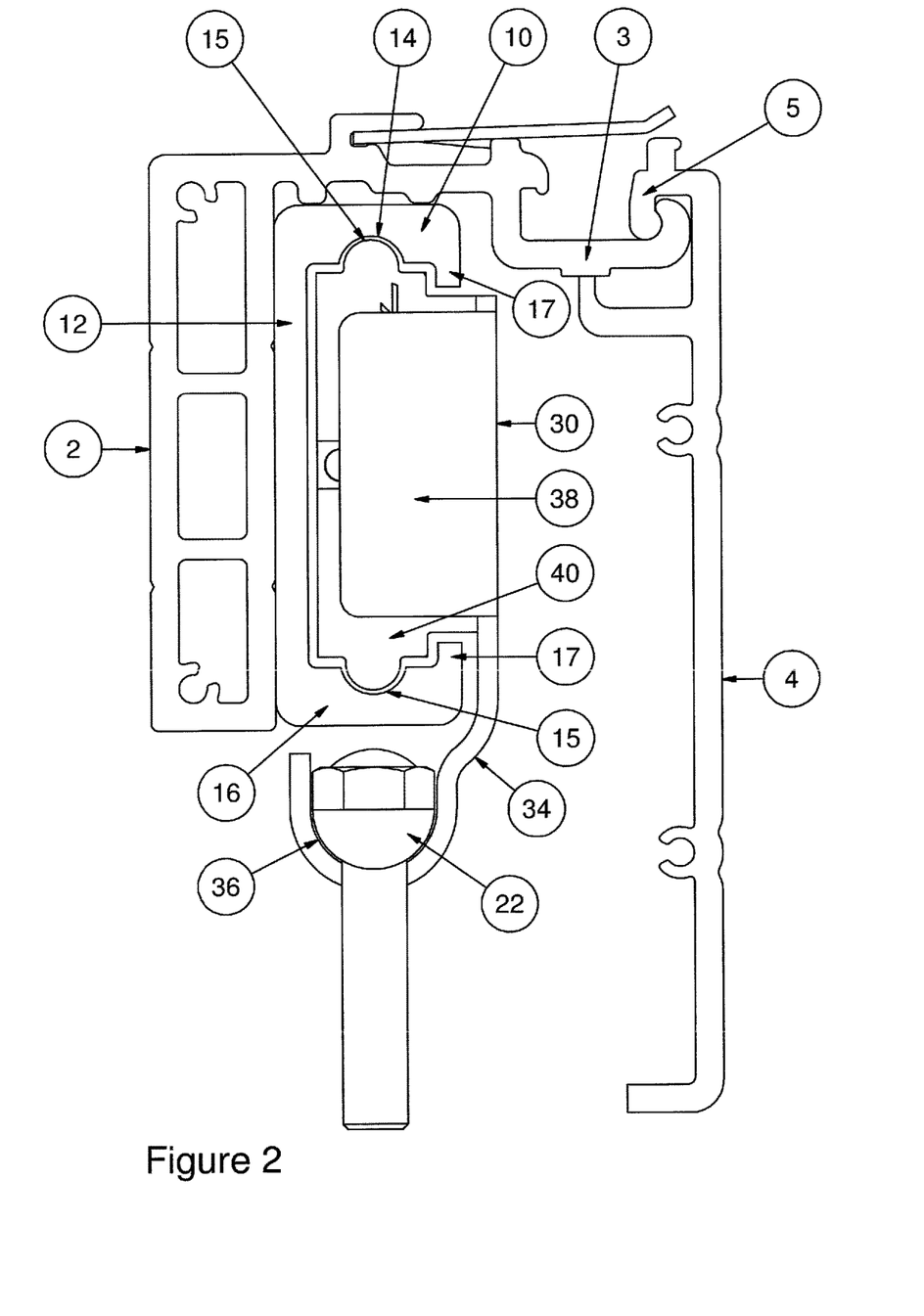
FIG. 2 is an end view of the recirculating sliding support assembly of FIG. 1.
Figure 3:
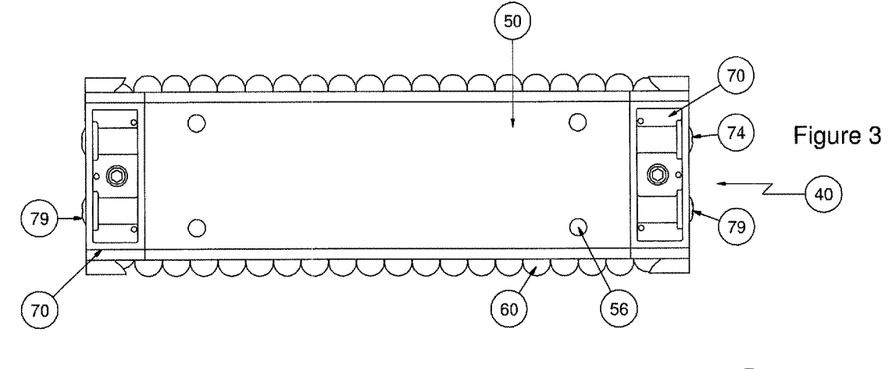
FIG. 3 is a side view of the slide cassette of the slide unit of FIG. 1.
Figure 4:
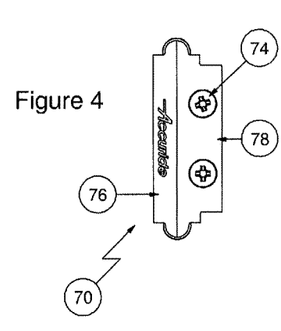
FIG. 4 is an end view of the slide cassette of FIG. 3.

The flanges 14, 16 further comprise inwardly projecting portions 17. The cross-section of the rail is such that the slide cassette 40 is maintained between the first and second flanges 14, 16 during use. Even in the event of failure of the slide cassette 40 (for instance, in the event of one of the end pieces 70 failing and bearing balls 60 being released from the endless tracks 80), the slide cassette 40 may only be removed from one of the ends of the rail 10.

The slide unit 6 comprises a slide cassette 40, the structure of which is most clearly seen in FIGS. 3 to 6.

The slide cassette 40 comprises two endless tracks 80 in each of which a plurality of bearing balls 60 are positioned. The bearing balls 60 may be formed from steel, such as stainless steel, or a plastics material.

Each of the first and second endless tracks 80 takes the shape of a racetrack. That is, each track 80 is in the shape of a rounded rectangle with curved ends 85. The curved ends 85 are substantially semi-circular. The endless tracks 80 are arranged in a plane which is parallel to the plane of the web 12 of the elongate rail 10. The portion of each rectangle closest to the adjacent flange 14, 16 of the elongate rail 10 comprises the outer linear portion 84 of the track 80, and the portion of the rectangle furthest from the adjacent flange 14, 16 of the elongate rail 10 comprises the inner linear portion 82 of the track 80.

Figure 7:
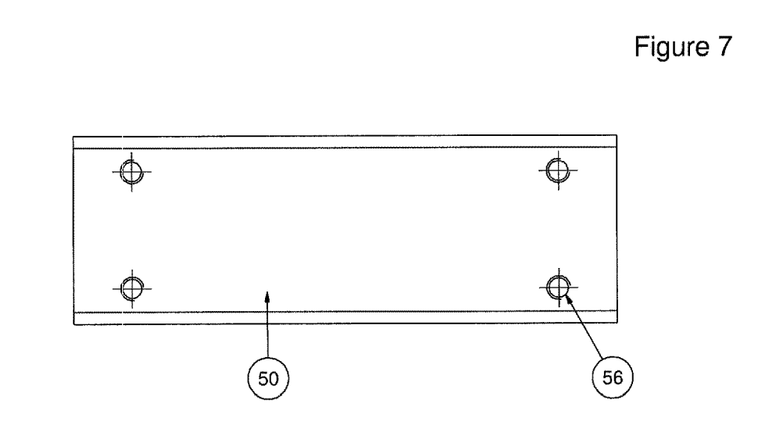
FIG. 7 is a side view of the body member of the slide cassette of FIG. 3.
Figure 8:
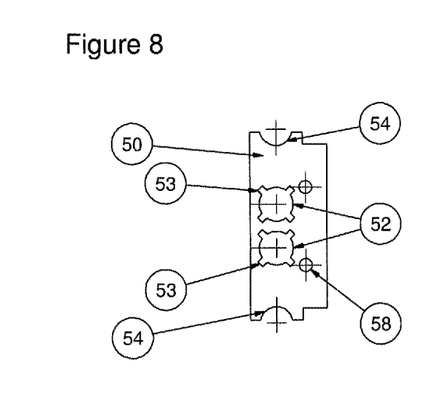
FIG. 8 is an end view of the body member of FIG. 7.

The slide cassette comprises an elongated body member 50 as shown in isolation in FIGS. 7 and 8. The body member 50 is formed of extruded material, such as extruded plastics, ceramic or metal. Preferably, the body member 50 is formed from extruded metal.

Most preferably, the body member 50 is formed from an extruded aluminium alloy, such as 6082. As seen in FIG. 8, the body member 50 comprises two longitudinal linear ducts 52 which form the respective inner linear portions 82 of the two endless bearing ball tracks, as shown in, for example, FIG. 6. The body further comprises two longitudinal concave channels 54 at opposite sides thereof, wherein the concave channels 54, along with the concave channels 15 of the first and second flanges 14, 16 of the rail 10, define the respective outer linear portions 84 of the two endless bearing ball tracks 80. As shown in FIG. 8, the ducts 52 and concave channels 54 are aligned in a direction perpendicular to the longitudinal direction. That is, the ducts 52 and concave channels 54 are arranged in a straight line perpendicular to the first and second flanges 14, 16 of the rail 10 such that the endless tracks 80 lie in a plane perpendicular to the web 12 of the rail 10.

The ducts 52 comprise cylindrical ducts with longitudinal grooves 53. As shown, each duct 52 comprises four grooves 53, but ducts of other embodiments may comprise different numbers of grooves, such as one, two or three grooves. The grooves 53 mate with protrusions 75 on the end pieces 70 to provide assistance in aligning the end pieces 70 with the body member 50, as will be further described below.

The grooves 53 may contain lubricant, such as grease, and thereby act as lubricant reservoirs for the endless tracks 80.

The body member 50 further comprises holes 56 and holes 58 for receiving the bracket mounting means and end piece fixation means respectively.

The slide cassette 40 further comprises end pieces 70. An end piece 70 is shown in isolation in FIGS. 9 to 12. The end pieces may be moulded from a plastics material or polymer, such as Polypropylene (PP), Nylon (PA) and Polyoxymethylene (POM), or a suitable elastomer such as a form of rubber, or similar material. Alternatively, the end pieces may be formed from machined or cast metal (such as aluminium or zinc) or ceramic.

The end pieces 70 are attached to the body member 50 by end piece fixation means 79 via fixation holes 74. Each end piece comprises two curved ducts 72, configured to connect each inner duct 52 of the body member 50 with the respective concave channel 54 to produce endless tracks 80. The curved ducts 72 are substantially semi-circular, but the ducts 72 may have any other suitable curved shape.

Figure 10:
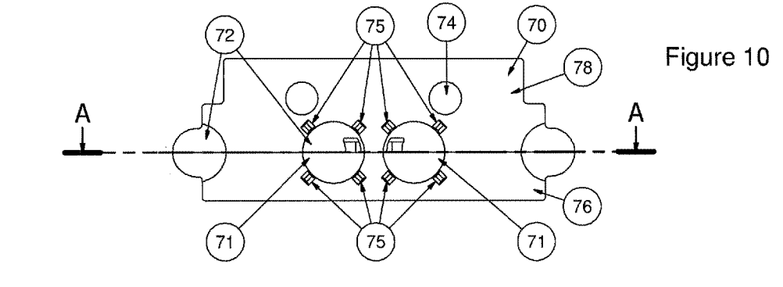
FIG. 10 is an internal end view of the end piece of FIG. 9.
Figure 11:
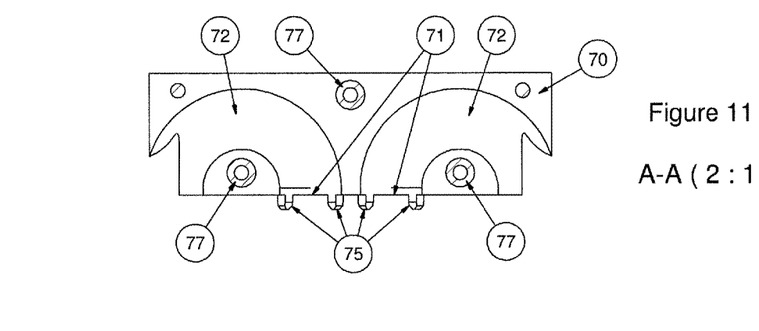
FIG. 11 is a cross-sectional view of the end piece of FIG. 9, where the cross-section is taken along the line A-A in FIG. 10.

The end piece 70 is formed of a first part 76 and a second part 78, wherein the division between the first and second parts 76, 78 is along line A-A in FIG. 10. The first and second parts 76, 78 are attached to one another by fixation means 77. The end piece 70 may comprise more than two parts. The end piece 70 may alternatively be formed as a single, monolithic piece. However, the end piece 70 is easier to manufacture as more than one part due to, for instance, the difficulties associated with moulding the curved ducts 72 in a monolithic end piece.

Figure 12:
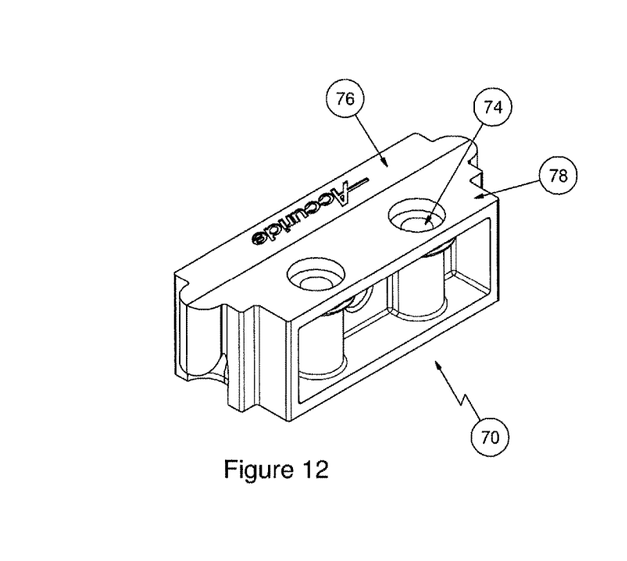
FIG. 12 is a perspective view of the end piece of FIG. 9.

The end piece 70 comprises four protrusions 75 around the inner outlet 71 of each of the curved ducts 72. The protrusions 75 mate with corresponding grooves 53 of the body member 50, thereby ensuring alignment of the curved ducts 72 with the inner linear ducts 52. The protrusions 75 ensure both that the end piece 70 and body member 50 are precisely aligned during construction and that the end piece 70 will not be shifted out of alignment with the body member 50 during use. Precise alignment of the inner linear ducts 52 and concave channels 54 of the body member 50 with the curved ducts 72 of the end piece 70 is important to avoid obstruction of the path of the bearing balls 60 around the endless tracks 80. Any lack of smoothness in the track of the bearing balls 60, for instance due to misalignment of components, increases the friction of the balls, which, in turn, increases the friction of the slide cassette 40 against the rail 10 as well as increasing the noise produced by the sliding support assembly in use.

Figures 5, 6:
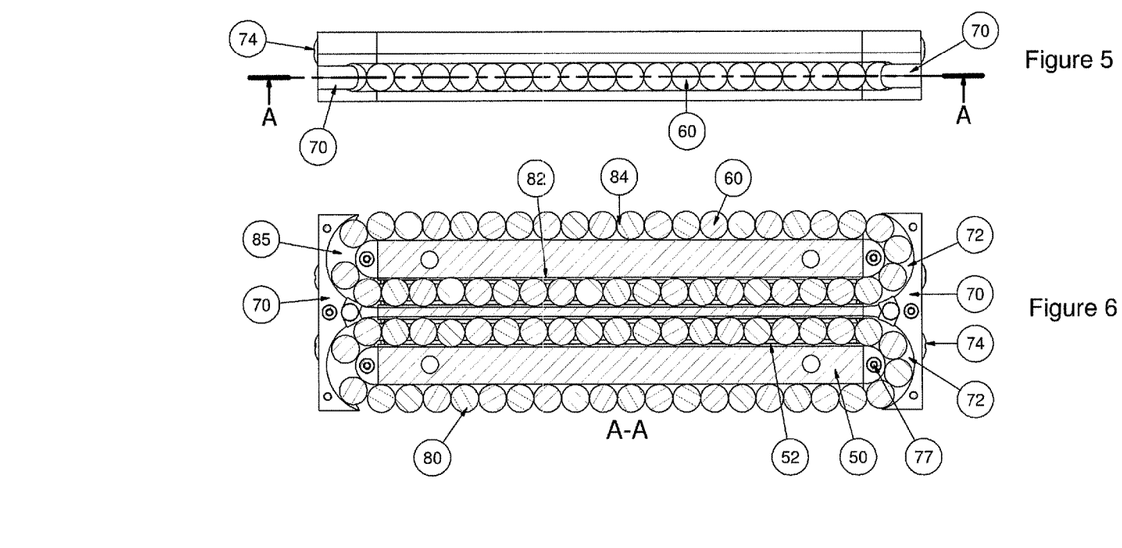
FIG. 5 is a bottom view of the slide cassette of FIG. 3.
FIG. 6 is a cross-sectional view of the slide cassette of FIG. 3, where the cross-section is taken along the line A-A in FIG. 5.

The bearing balls 60 are positioned within the endless tracks 80 and, in use, roll around the endless tracks 80. The balls 60 roll along the outer linear portions 86 of the tracks 80, in contact with both the elongate rail 10 and the body member 50, where they are used to reduce friction between the rail 10 and the body member 50. The balls in the outer linear portions 84 therefore move linearly relative to both the rail and the body member 50 of the slide cassette 40. When the balls 60 reach the trailing ends of the outer linear portions 84, they are pushed around the curved ducts 85 of the endless tracks 80 and along the inner ducts 52 of the body member 50 by the continued movement of the balls 60 remaining in the outer linear portions 84. Thus the balls 60 circulate, reducing friction between the slide cassette 40 and the rail 10.

Known sliding support assemblies with recirculating balls comprise slide cassettes with body members formed from, for example, pressed or machined steel.

Forming the body member of an extruded material provides several advantages over previously-known slider bodies. For example, the desired length of the body member may vary depending on the intended use; longer body members may be desirable for heavier duty applications, since increased length confers higher strength. The lengths of produced extruded body members may be easily varied without substantial changes to the manufacture apparatus. In contrast, to vary the length of a body member formed from, for example, moulded plastics material or cast metal would require the production of alternative moulds or casts which may be expensive and/or time-consuming. Similarly, machinery for pressing metal to form a body member would not be easily adapted to produce body members of varying lengths.

Some known slider bodies are formed from machined material, such as machined steel. Machined slider bodies may reach a high degree of precision. However, the machining process is expensive; the costs associated with extrusion are far lower.

Some known slider bodies (such as those disclosed in U.S. Pat. No. 5,518,317 and EP 1 363 036) comprise a sheet of metal pressed into the required shape. Due to the nature of this technique, each metal part is limited in design and flexibility to those shapes which may be pressed from a single sheet. Under load, the pressed metal parts are typically subject to forces perpendicular to the sheet and, under high-load conditions, failure may occur due to deformation of the sheet metal. Using an extruded body as shown for the slider means that additional load on the slider results in additional compressive stress which is less likely to result in failure.

Moreover, due to the limitations in possible shapes of pressed metal parts, the central load-bearing sections of such known sliders must contain several parts in order to provide the necessary inner and outer linear portions of the endless tracks. The connections between these parts may provide further structural weaknesses increasing the likelihood of failure under heavy loads. When formed from extruded material, the central load-bearing part of the cassette (including the inner linear portions and the inner edge of the outer linear portions of the endless tracks) may be monolithic, thereby avoiding such potential weaknesses.

In heavy-duty applications, low friction for the slide is advantageous. One way to minimise friction in a sliding support assembly is to allow additional space between the rail and the endless tracks of bearing balls. That is, if the rail tightly grips the slide cassette via the bearing balls then there is a lot of friction; if the rail only loosely grips the slide cassette via the bearing balls then there is less friction. Moreover, the rail having a relatively loose grip on the slide cassette allows for an increased manufacture tolerance, negating the potential need for secondary machining or sizing which may be necessary in the manufacture of known slider bodies to ensure that the slide cassette fits sufficiently snugly within the rail. Clearly avoiding secondary machining or sizing of the slider bodies advantageously decreases the cost and time of manufacture. However, an additional advantage of this increased tolerance is that it allows the slide units and rails to be interchangeable such that a slide unit may be supplied separately from the rail and be compatible therewith without extra machining or sizing.

However, clearly there is an increased risk of the slide cassette disengaging from the rail if the rail only loosely grips the slide cassette. The risk of disengagement may be mitigated by having relatively deep concave channels in the body member, such that the arc of the cross section of the concave channel is close to semi-circular. In this case, even with a relatively loose connection to the rail, the slide cassette will not disengage. Using pressed steel, however, it is difficult to achieve a sufficient length of arc of the concave channel to ensure that the slide cassette will not disengage from the rail if the rail is only loosely gripping the slide cassette. Due to the nature of extrusion, it is possible to achieve the desired shape.

Figures 13, 14:
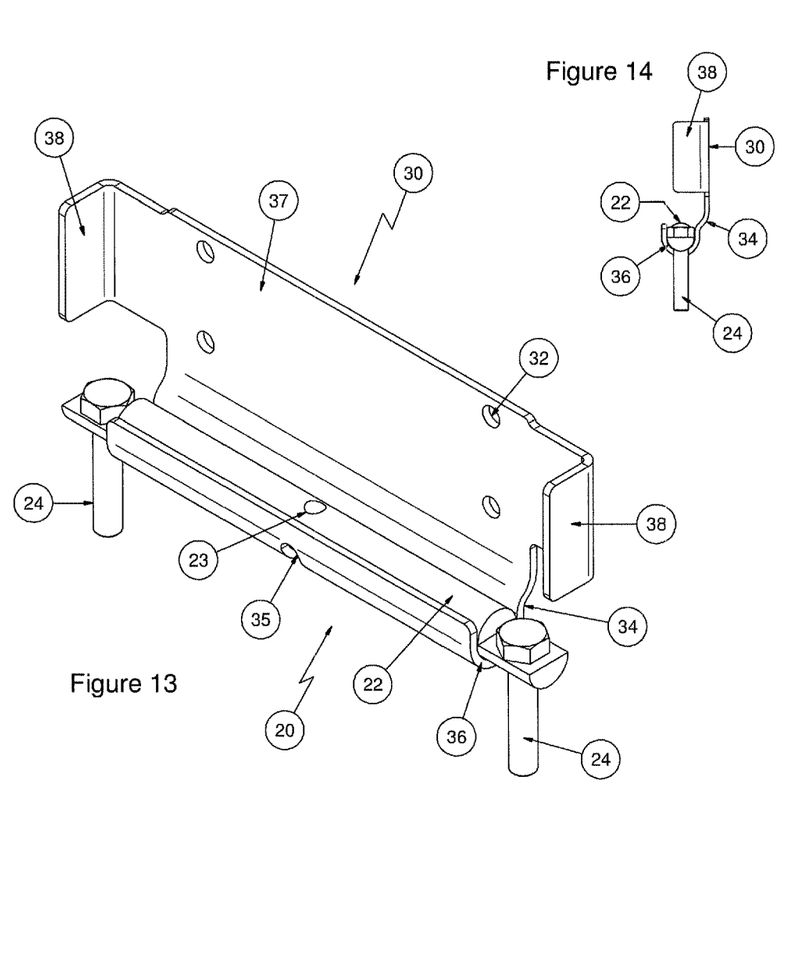
FIG. 13 is a perspective view of the bracket of the slide unit of FIG. 1.
FIG. 14 is an end view of the bracket of FIG. 13.
Figure 15:
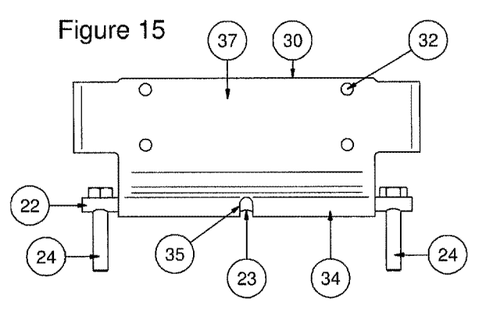
FIG. 15 is a front view of the bracket of FIG. 13.
Figure 16:
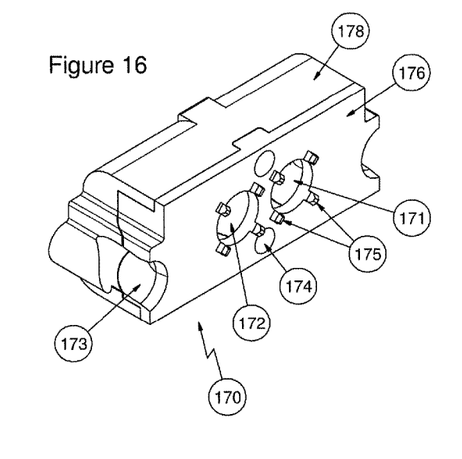
FIG. 16 is a perspective view of an end piece for a slide cassette of a second embodiment of the present invention.

Bracket mounting means mount the bracket 30 to the slide cassette 40 via holes 32. The bracket 30 is preferably formed from pressed steel, but may be formed from any other suitable material, such as pressed or extruded aluminium alloys.

The bracket 30 comprises a hooked portion 34. The hooked portion 34 extends substantially parallel to the first web 12 of the rail 10 beyond the second flange 16 and curves back towards the second flange 16 to define a longitudinal channel 36 of the hooked portion 34. The hooked portion 34 supports a bar 22 in the channel 36.

A gap exists between the end of the hooked portion 34 and the rail 10, such that the hooked portion 34 does not contact the rail 10 since this would cause increased friction for the slide cassette 40. However, the end of the hooked portion 34 extends sufficiently towards the rail 10 such that the bar 22 is prevented from escaping the channel 36 through the gap between the hooked portion 34 and the rail 10.

The hooked portion 34 further comprises a circumferential slot 35 through which locating means may be attached to the bar 22 via hole 23. The interaction of the locating means with the slot in the hooked portion 34 prevents longitudinal or axial movement of the bar 22 relative to the bracket 30, while allowing rotation of the bar 22 relative to the bracket 30 around the longitudinal axis of the bar 22.

The bar 22 is connectable to an object, such as a door, using securing means 24 mounted to the bar. The securing means 24 may comprise bolts extending from the bar. In the embodiment shown, the bolts are threaded hexagon-head bolts, although any suitable attachment means can be used.

The channel 36 of the hooked portion 34 is substantially vertically aligned with the channel 15 of the second flange 16, such that the centre of mass of the bar (and any object hanging therefrom, such as a door) is aligned with the channel 15 and the endless bearing ball track 80 associated therewith.

The bracket 30 and bar 22 combine to facilitate a connection between the slide cassette 40 and an object (such as a door) which allows the object to rotate, to a certain extent, around the longitudinal axis of the bar 22, without such rotation placing a twisting stress on the slide cassette 40. It is desirable to avoid such twisting stress on the slide cassette 40, since such forces may cause the slide cassette 40 to disengage from the rail 10.

While objects attached to the slide assembly 1 may be nominally constrained not to rotate in this plane, it is desirable to provide some mechanism for rotational movement, since it is, in practice, difficult to fully constrain the movement of the object to a single plane. For instance, a sliding door attached to the slide assembly 1 would typically be constrained to avoid the bottom of the door swinging in an inward or outward direction. However, due to, for instance, building tolerances in the construction of the door frame, it may be necessary to allow for some degree of rotation. The fixation means 20 (comprising the bracket 30 and bar 22) prevent damage to the slide cassette 40 and rail 10 from this rotation.

The bracket 30 further includes a front plate 37 (which is attached to the slide cassette 40 via bracket mounting means holes 32) and end sections 38. End sections 38 may be formed by pressing or bending side portions of the front plate. The end sections 38 at least partially wrap around the slide cassette 40, both providing additional support for the connection of the end portions 70 to the body member 50 and allowing the shear force to be transferred effectively between the slide cassette 40 and the bracket 30 in use without placing unnecessary stress on the bracket mounting means.

The rail 10 may further comprise end buffers or dampers at either end thereof. The end buffers or dampers delimit the extent to which the slide unit 6 may slide along the rail 10 and provide damping to avoid damage due to the impact of the slide unit 6 against the end of the rail 10. The end buffers or dampers may be configured to impact the end sections 38 of the bracket 30 to further reduce the risk of damage to the relatively weak end pieces of the slide cassette 40.

FIGS. 16 to 19 show an end piece 170 in accordance with a second embodiment of the present invention. The end piece 170 is substantially similar to the end piece 70 described above in relation to the first embodiment and corresponding reference numerals have been used to label the corresponding features such as curved ducts 172, fixation holes 174 and protrusions 175.

Figures 17, 19:
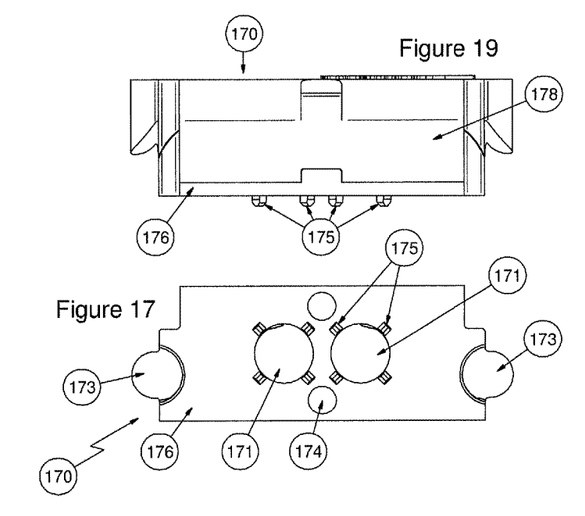
FIG. 17 is an internal end view of the end piece of FIG. 16.
FIG. 19 is a side view of the end piece of FIG. 16.
Figure 18:
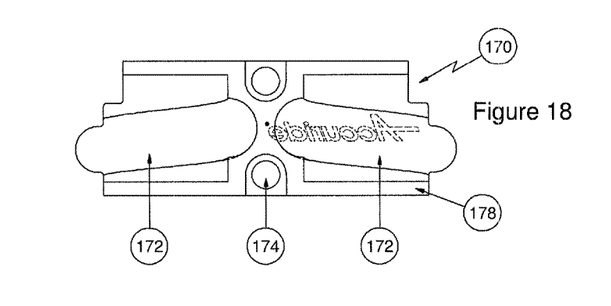
FIG. 18 is an end view of the end piece of FIG. 16.

The end piece 170 comprises two substantially semi-circular curved ducts 172, as above. However, in this embodiment, the ducts 172 are not aligned in a plane parallel to the side of the end piece 170 (that is, parallel to the web 12 of the rail 10, in use). As shown in FIG. 17, the inner curved duct outlets 171 which connect to the respective inner linear portions of the endless track are offset from the outer curved duct outlets 173 which connect to the respective outer linear portions of the endless track, such that the first curved duct lies in a plane which is angled with respect to the plane of the second curved duct.

A body member for use with end piece 170 would have correspondingly offset inner and outer linear portions of the endless tracks such that the first endless track lies in a plane which is angled with respect to the plane of the second endless track. That is, the longitudinal ducts of the body member (defining the inner linear portions of the endless tracks) would be correspondingly offset from the concave channels of the body member (defining the outer linear portions of the endless tracks) such that the longitudinal ducts are a greater distance from the web 12 of the rail 10 than the concave channels, in use.

Configuring the first and second endless tracks to lie in planes angled with respect to one another may be beneficial in that this configuration allows the fixation holes 174 (and therefore the associated end piece fixation means) to be arranged in a more balanced configuration providing additional strength to the connection between the end piece 170 and the body member.

The end piece is also formed of a first part 176 and a second part 178. However, in this embodiment, the first part 176 is the part which would be closer to the body member in use, and forms the inner curved sections of the curved ducts 172. The second part is the part which would be further from the body member in use, and forms the outer curved sections of the curved ducts 172. This configuration illustrates an alternative way of dividing an end piece into two easily-mouldable sections.

Figure 20:
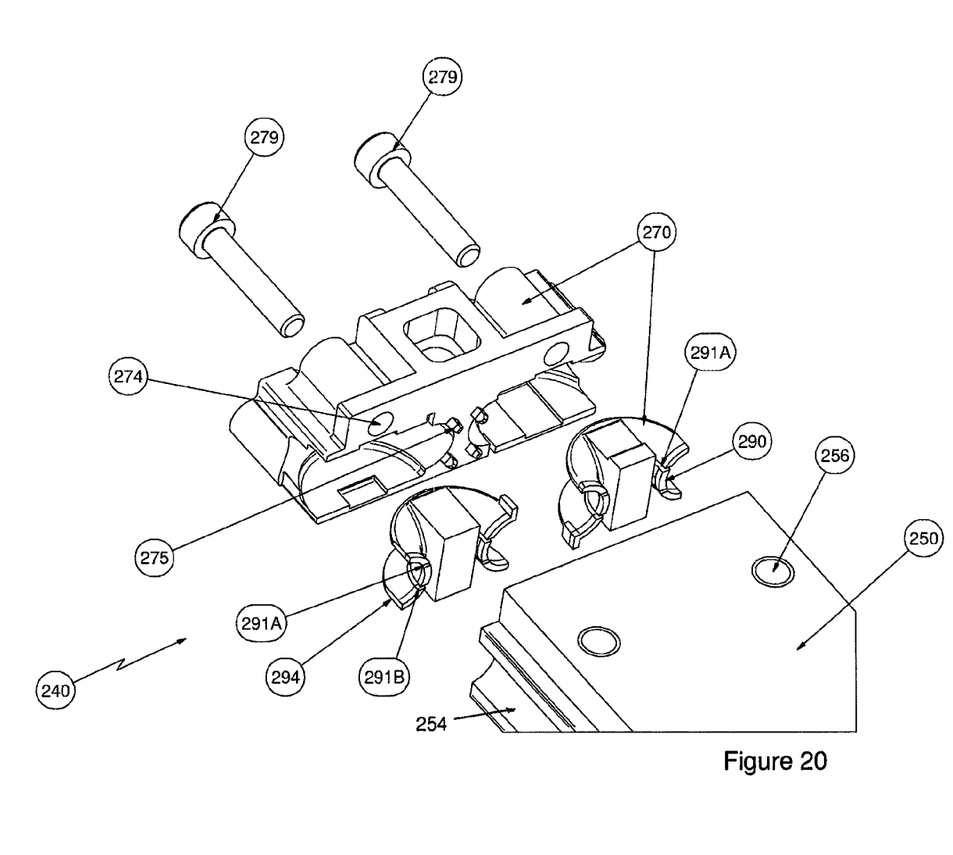
FIG. 20 is a deconstructed perspective view of a slide cassette of a third embodiment of the present invention.
Figure 21:
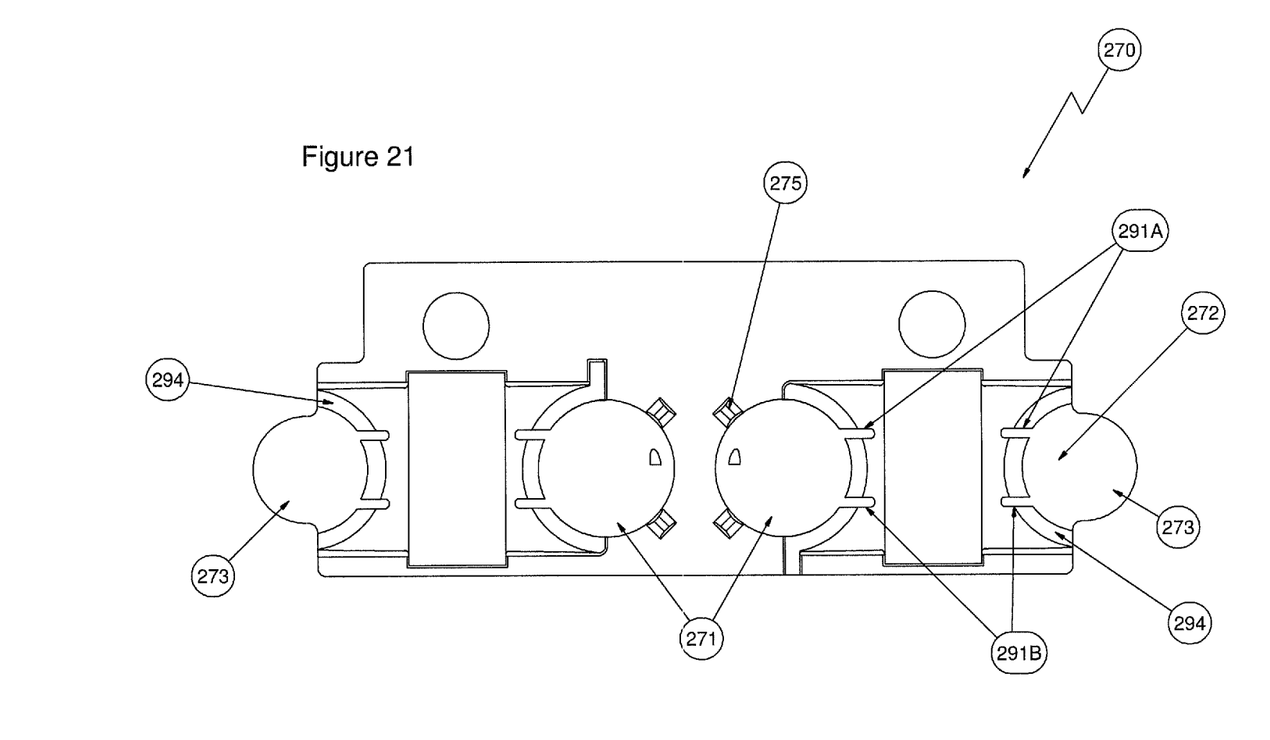
FIG. 21 is an internal end view of the end piece of FIG. 20.

FIG. 20 shows a slide cassette 240 according to a third embodiment of the invention and FIG. 21 shows an internal end view of the end piece 270 of the slide cassette of FIG. 20. This slide cassette 240 of this embodiment is substantially similar to the previously-described embodiments and corresponding reference numerals have been used to label the corresponding features such as body member 250, holes 256, concave channel 254, end piece 270, protrusions 275, fixation holes 274 and end piece fixation means 279.

The end piece 270 differs from the end pieces (70, 170) described above in that the end piece 270 comprises resilient members 290. In the illustrated embodiment, four resilient members 290 are shown. However, in general, the end piece 270 may comprise any number of resilient members 290, such as one, two, three or more.

Each resilient member 290 forms at least a portion of the wall of the curved duct 272. The portion of the wall of the curved duct formed by the resilient member comprises a portion of the wall adjacent to at least one of the inner and outer curved duct outlets 271, 273.

As shown in the figures, the resilient members 290 are located on the inside curve of the curved ducts 272, at each of the inner and outer curved duct outlets 271, 273, where the curved ducts 272 connect to the linear ducts and concave channels 254 respectively of body member 250. In general, however, resilient members may be located at only some of the inner and outer curved duct outlets 271, 273. For instance, resilient members 290 may be located only at the outer curve duct outlets 273 or only at the inner curved duct outlets 271.

Each resilient member 290 shown in the figures is formed by two slits 291A, 291B in the wall of the inside curve of the curved ducts 272. The section of the wall 294 of the curved duct 272 between the two slits 291A, 291B forms the resilient member 290. However, in general, the resilient member 290 may be formed by any suitable means. For instance, the wall, or a portion thereof, of the curved duct 272 may be formed of rubber. Since rubber is inherently resilient, the rubber of the wall of the curved duct 272 may form the resilient member 290 without requiring slits 291A, 291B.

The resilient member 290 may be formed of the same material as the rest of the end piece 270. Alternatively, the resilient member may be formed of a different material to the material of the rest of the end piece 270. The resilient member 290 may be formed of any suitable material, such as moulded plastics material, rubber or steel.

Figure 9:
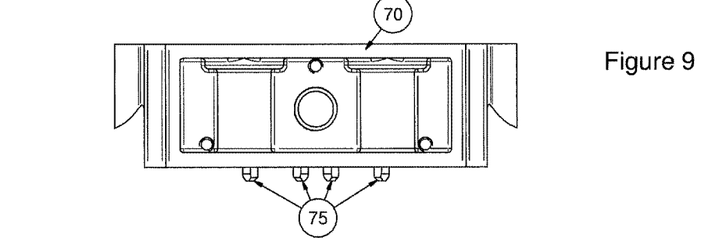
FIG. 9 is a side view of an end piece of the slide cassette of FIG. 3.

Known recirculating ball slides are, in general, noisy in operation. It has been found that one source of noise in the operation of such slides is the transition of bearing balls from the body member to the end pieces, and vice versa. In the slide described above with reference to the figures, for instance, if the inner and outer curved duct outlets 71 of an end piece 70 were not perfectly aligned with the corresponding linear ducts 52 and concave channels 54 of the body member 50 then the bearing balls would experience a slight step or discontinuity in the wall of the endless track 80 at the transitions between the body member 50 and the end piece 70. While this effect may be minimised by more precisely matching and aligning the end piece 70 and body member 50 (by using, for instance, alignment means such as protrusions 75), it is, in practice, impossible to produce a transition which is perfectly aligned and seamless given the practical tolerances of manufacturing processes.

The resilient member 290 of the present invention reduces the noise of bearing balls 60 crossing, for instance, from sections of the endless track 80 associated with the body member 250 to the curved ducts 272 of the end piece 270 or vice versa.

It will be appreciated that the embodiments shown in the figures are by way of example only, and that alterations or modifications may be made within the scope of the invention as defined in the appended claims.

The invention claimed is:

1. A sliding support assembly comprising:
   an elongate rail of channel section defining a first web and first and second flanges;
   a slide cassette positioned between the first and second flanges of the elongate rail such that the slide cassette and the first and second flanges define a first endless track and a second endless track; and
   a plurality of bearing balls positioned within the first and second endless tracks;
   wherein the slide cassette comprises a body member formed from extruded material,
   wherein the body member comprises a first linear duct forming an inner linear portion of the first endless track and a second linear duct forming an inner linear portion of the second endless track,
   wherein the body member further comprises a concave channel forming an outer linear portion of the first endless track and a second concave channel forming an outer linear portion of the second endless track,
   wherein the slide cassette further comprises a first end piece and a second end piece,
   wherein the first and second end pieces each comprise a first curved duct and a second curved duct and wherein the first curved duct connects the inner linear portion of the first endless track to the outer linear portion of the first endless track, and the second curved duct connects the inner linear portion of the second endless track to the outer linear portion of the second endless track,
   wherein the first curved duct comprises a resilient member, and
   wherein the end piece comprises two slits and wherein the two slits define the resilient member.

2. A sliding support assembly comprising:
   an elongate rail of channel section defining a first web and first and second flanges;
   a slide cassette positioned between the first and second flanges of the elongate rail such that the slide cassette and the first and second flanges define a first endless track and a second endless track; and
   a plurality of bearing balls positioned within the first and second endless tracks;
   wherein the slide cassette comprises a body member formed from extruded material, and further comprising:
   a bracket mounted to the slide cassette for sliding therewith, wherein the bracket comprises a hooked portion defining a channel in which a bar is supported.

3. The sliding support assembly of claim 2 wherein the bracket comprises first and second end sections which extend around first and second ends of the slide cassette respectively.

4. An end piece for a slide cassette comprising:
   a first curved duct and a second curved duct, wherein each curved duct is suitable for forming part of an endless track for bearing balls,
   wherein the first curved duct comprises a resilient member, and
   wherein the end piece comprises two slits and wherein the two slits define the resilient member.

5. The end piece of claim 4 wherein the resilient member forms at least a portion of a wall of the first curved duct and the portion of the wall of the first curved duct is adjacent to an outlet of the first curved duct.

6. The end piece of claim 4 wherein the resilient member forms at least a portion of a wall of the first curved duct and the portion of the wall of the first curved duct is on an inside curve of the first curved duct.

7. The end piece of claim 4 wherein the resilient member is formed of moulded plastics material.

8. An end piece for a slide cassette comprising:
a first curved duct and a second curved duct, wherein each curved duct is suitable for forming part of an endless track for bearing balls,
wherein the first curved duct comprises a resilient member;
an alignment means that comprises at least one protrusion extending from the end piece,
wherein the at least one protrusion is one of a first plurality of protrusions located around an outlet of the first curved duct.

9. The end piece of claim 8 wherein a second plurality of protrusions is located around an outlet of the second curved duct.

10. The end piece of claim 8 wherein the curved ducts are substantially semi-circular.

11. The end piece of any of claim 8 wherein the first curved duct lies in a first plane which is angled with respect to a second plane in which the second curved duct lies.

12. A sliding support assembly comprising:
an elongate rail of channel section defining a first web and first and second flanges;
a slide cassette positioned between the first and second flanges of the elongate rail such that the slide cassette and the first and second flanges define a first endless track and a second endless track; and
a plurality of bearing balls positioned within the first and second endless tracks;
wherein the slide cassette comprises a body member formed from extruded material and wherein the slide cassette comprises a first end piece according to claim 8 and a second end piece according to claim 8.

* * * * *